(12) United States Patent
Reinhard

(10) Patent No.: US 9,017,538 B2
(45) Date of Patent: Apr. 28, 2015

(54) APPARATUS AND METHOD FOR BRINE SEPARATION AND REUSE

(71) Applicant: Exergy Technologies Corporation, Irvine, CA (US)

(72) Inventor: Fred P. Reinhard, Mission Viejo, CA (US)

(73) Assignee: Exergy Technologies Corporation, Irvine, CA (US)

( * ) Notice: Subject to any disclaimer, the term of this patent is extended or adjusted under 35 U.S.C. 154(b) by 0 days.

(21) Appl. No.: 13/652,401

(22) Filed: Oct. 15, 2012

(65) Prior Publication Data

US 2013/0098756 A1 Apr. 25, 2013

Related U.S. Application Data

(63) Continuation of application No. 10/763,691, filed on Jan. 22, 2004, now abandoned.

(51) Int. Cl.
| | |
|---|---|
| *B01D 61/46* | (2006.01) |
| *C25B 15/08* | (2006.01) |
| *C02F 1/469* | (2006.01) |
| *C02F 101/10* | (2006.01) |
| *C02F 101/12* | (2006.01) |
| *C02F 101/20* | (2006.01) |

(52) U.S. Cl.
CPC ............... *C25B 15/08* (2013.01); *C02F 1/469* (2013.01); *C02F 1/4693* (2013.01); *C02F 1/4695* (2013.01); *C02F 2101/103* (2013.01); *C02F 2101/12* (2013.01); *C02F 2101/20* (2013.01); *C02F 2201/46115* (2013.01)

(58) Field of Classification Search
USPC ............................. 204/630, 633, 263, 275.1
See application file for complete search history.

(56) References Cited

U.S. PATENT DOCUMENTS 3,663,417 A * 5/1972 Heit et al. ............ 204/633
5,352,345 A * 10/1994 Byszewski et al. ........ 204/534

* cited by examiner

*Primary Examiner* — Arun S Phasge
(74) *Attorney, Agent, or Firm* — Blakely, Sokoloff, Taylor & Zafman LLP

(57) ABSTRACT

According to one embodiment, an electrolytic membrane separation (EMS) subsystem is configured to remove one or more impurities from a contaminated reject solution and to recycle the reusable reject solution for subsequent use in regenerating ion exchange resins. According to another embodiment of the invention, the EMS subsystem is configured to concentrate the impurities recovered from the contaminated brine solution for subsequent disposal or treatment.

13 Claims, 14 Drawing Sheets

APPARATUS AND METHOD FOR BRINE SEPARATION AND REUSE

CROSS-REFERENCES TO RELATED APPLICATIONS

This is a Continuation Application of U.S. patent application Ser. No. 10/763,691, filed on Jan. 22, 2004. This Continuation Application is based upon and claims the benefit of priority of the U.S. patent application Ser. No. 10/763,691, the entire contents of which are incorporated herein by reference.

FIELD

The invention relates to the field of electrolytic membrane separation systems.

GENERAL BACKGROUND

Currently, there exist a number of conventional systems for separating impurities from a feed solution. For example, ion exchange systems are configured with resins to extract impurities from a feed liquid such as groundwater and/or potable water. These impurities are accumulated until the ion exchange resin has been exhausted, namely all of the replacement ions coated on the resin are gone. Thereafter, the ion exchange resin must be either disposed of as a hazardous material or regenerated.

In order to regenerate the ion exchange resin, a large volume of brine solution is applied thereto. In most cases, the brine solution is an aqueous solution, perhaps with an elevated level of minerals, such as replacement ions for ion exchange resin regeneration.

During regeneration of the resin, the brine solution causes the impurities to be released. As a result, a large volume of brine solution, perhaps a thousand or more gallons of brine solution in some cases, is contaminated with the released impurities (hereinafter referred to as "contaminated brine solution"). Usually, the contaminated brine solution needs to be transported to an off-site waste treatment facility. Such removal of the contaminated brine solution poses a substantial cost.

Similarly, membrane separation systems are designed with a membrane to separate different ionic material from water. For example, nano-filtration uses a porous membrane that is partially permeable to perform such separation. The separated ionic materials are as part of the reject solution that is output along with the filtered water. Since the composition of the reject solution is substantially water, and only a small amount of separated ionic material, it is not cost effective to merely dispose of the reject solution.

Clearly, it would be advantageous from a cost standpoint to recycle the contaminated brine solution or reject solution as well as reduce the volume of materials that need to be treated as waste.

BRIEF DESCRIPTION OF THE DRAWINGS

The features and advantages of the invention will become apparent from the following detailed description of the invention in which.

DETAILED DESCRIPTION

Herein, an exemplary embodiment of the invention relates to an electrolytic membrane separation (EMS) subsystem and improved operations thereof. According to one embodiment, the EMS subsystem is configured to remove one or more impurities from a contaminated brine solution and to recycle the reusable brine solution for subsequent use in regenerating ion exchange resins. According to another embodiment of the invention, the EMS subsystem is configured to concentrate the impurities recovered from the contaminated brine solution for subsequent disposal or treatment.

Herein, the embodiments of the invention described are not exclusive; rather, they merely provide a thorough understanding of the invention. Also, well-known chemicals, reactions and elements are not set forth in detail in order to avoid unnecessarily obscuring the invention.

In the following description, certain terminology is used to describe features of the invention. For example, the term "brine solution" is water combined with certain minerals at an elevated level. Examples of the concentrated minerals include, but are not limited or restricted to the targeted impurities. Of course, for certain systems, it is contemplated that the brine solution may be a non-aqueous, conductive solution with an elevated level of certain minerals.

A "spacer" is generally defined as a device that provides a defined distance between either adjacent membranes or a membrane and electrode for liquid to flow or move therebetween. Normally, the spacer is non-conductive. A "membrane" is generally defined as a thin section of material that allows ions of a certain chemical composition to migrate from one side to another, while ions of another chemical composition are precluded from passing through the material. A "solution" is a liquid of any chosen chemical composition.

I. General Architecture of the Process System

Figure 1:
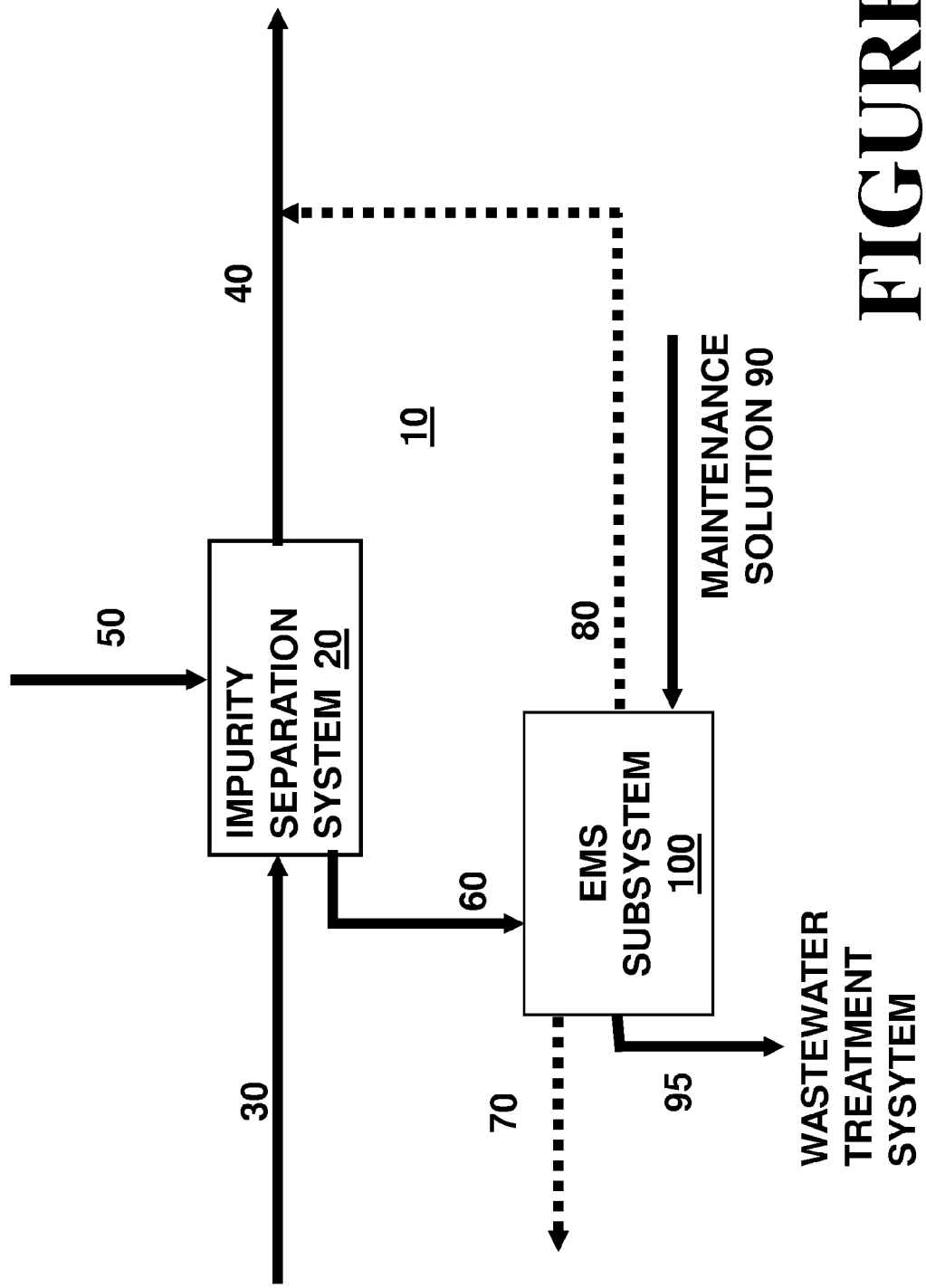
FIG. 1 is an exemplary embodiment of a process system that not only reduces the volume of waste required for treatment or disposal, but also recycles the brine solution for reuse.

Referring to FIG. 1, an exemplary embodiment of a process system 10 is shown that not only reduces the volume of waste required for treatment or disposal, but also recycles the brine solution for reuse. The process system 10 comprises an impurity separation subsystem 20 and an electrolytic membrane separation (EMS) subsystem 100. It is contemplated that the impurity separation subsystem 20 may be either a membrane separation system (e.g., micro-filter, ultra-filter, nano-filter, Reverse Osmosis unit) or an ion exchange unit. The membrane separation system would accumulate impurities migrating through one or more membranes and output a reject solution featuring these accumulated impurities. The ion exchange unit would accumulate impurities on the ion exchange resin and such impurities would be released in the regenerate brine solution applied to the resin.

Herein, the impurity separation subsystem 20 accumulates and releases targeted impurities that have migrated through one or more selected membranes. For instance, for this embodiment of the invention, a process solution 30 (e.g., an aqueous solution such as groundwater and/or potable water) is fed into the impurity separation subsystem 20, which removes selected impurities such as monovalent ions (e.g., perchlorate), anions (e.g., arsenate), heavy metals (e.g., Nickel "Ni", Copper "Cu", Cadmium "Cd", lead "Pb", etc.) and the like. A solution 40, such as a filtrate that is substantially free from the targeted impurities, is produced. Moreover, a reject solution 60, perhaps brine solution used for regeneration purposes, is supplied to the EMS subsystem 100.

For instance, when the impurity separation system 20 is deployed as an ion exchange unit and the ion exchange resin is exhausted, a brine (regenerate) solution 50 is directed to flow through the ion exchange resin. This causes the captured impurities to be released into the brine solution. The brine solution, now with a higher concentration of the selected impurities (hereinafter referred to as the "contaminated brine solution") 60 is routed as the reject solution to the EMS subsystem 100.

When the impurity separation system 20 is deployed as a membrane separation system, impurities from the process solution 30 are captured by the membrane and directly released as part of the reject solution 60. The reject solution 60, now with the impurities, is routed to the EMS subsystem 100.

II. General Architecture of the EMS Subsystem

Figure 2:
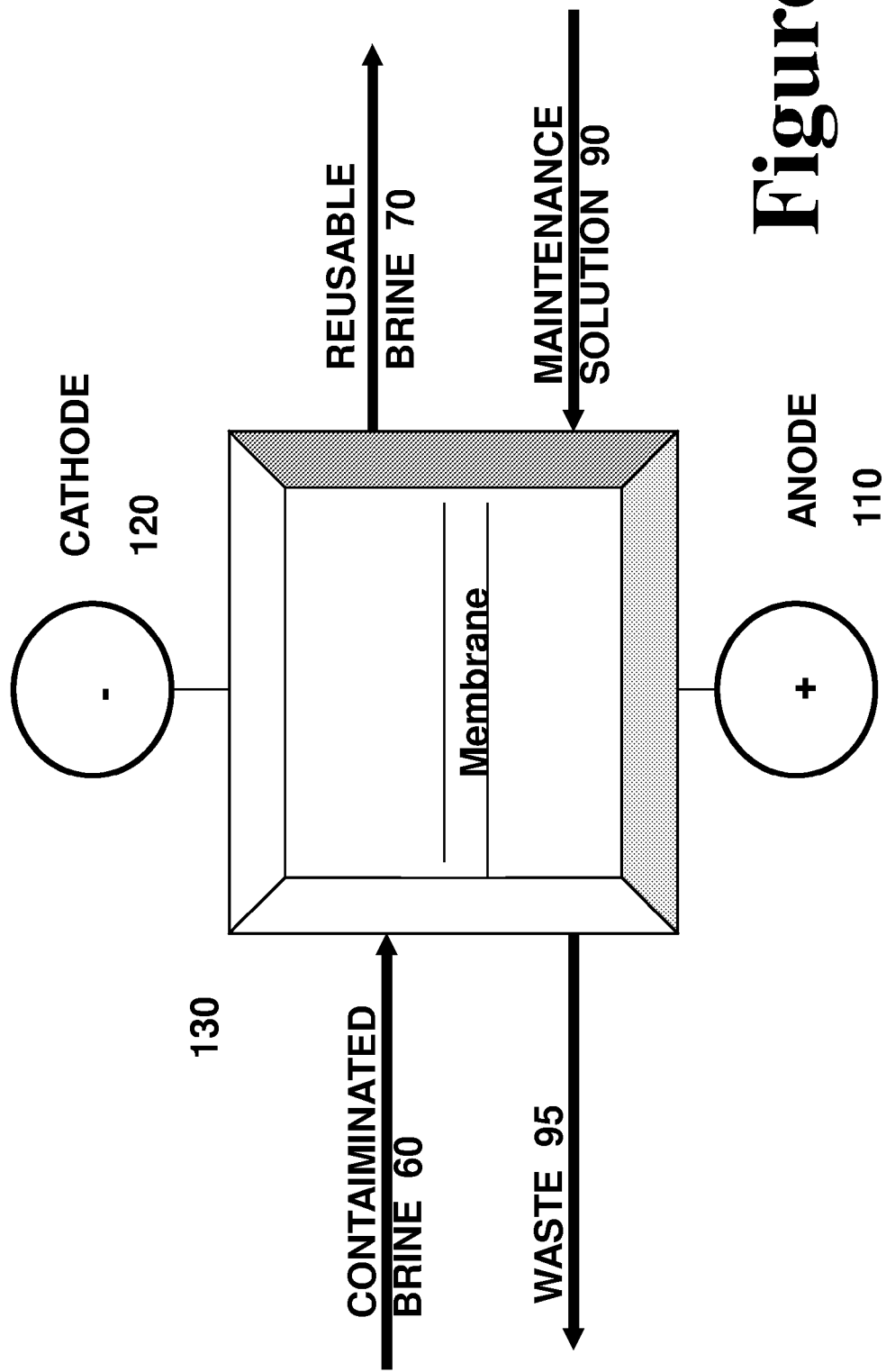
FIG. 2 is an exemplary embodiment of a membrane electrolysis (ME) unit associated with the EMS subsystem of FIG. 1.

Referring now to FIGS. 1 and 2, the EMS subsystem 100 comprises an anode 110 and a cathode 120 being a part of a reject process unit 130. According to one embodiment, the reject process unit 130 is a membrane electrolysis (ME) unit. According to another embodiment of the invention, the reject process unit 130 is an electrodialysis (ED) unit. The reject process unit 130 receives and processes the contaminated brine solution 60 to produce either a reusable brine solution 70 or diluate 80, which is sufficiently free from targeted impurities to be supplied to the second solution 40. The optional production of reusable brine solution 70 or diluate 80 is represented by dashed lines.

As described below, a maintenance solution 90, namely a selected electrically conductive solution, is supplied to the reject process unit 130 to receive the impurities. Therefore, the maintenance solution 95 with an elevated level of impurities is waste for subsequent storage or treatment.

III. Exemplary Architectures of the ME Unit & ED Unit

Figure 3:
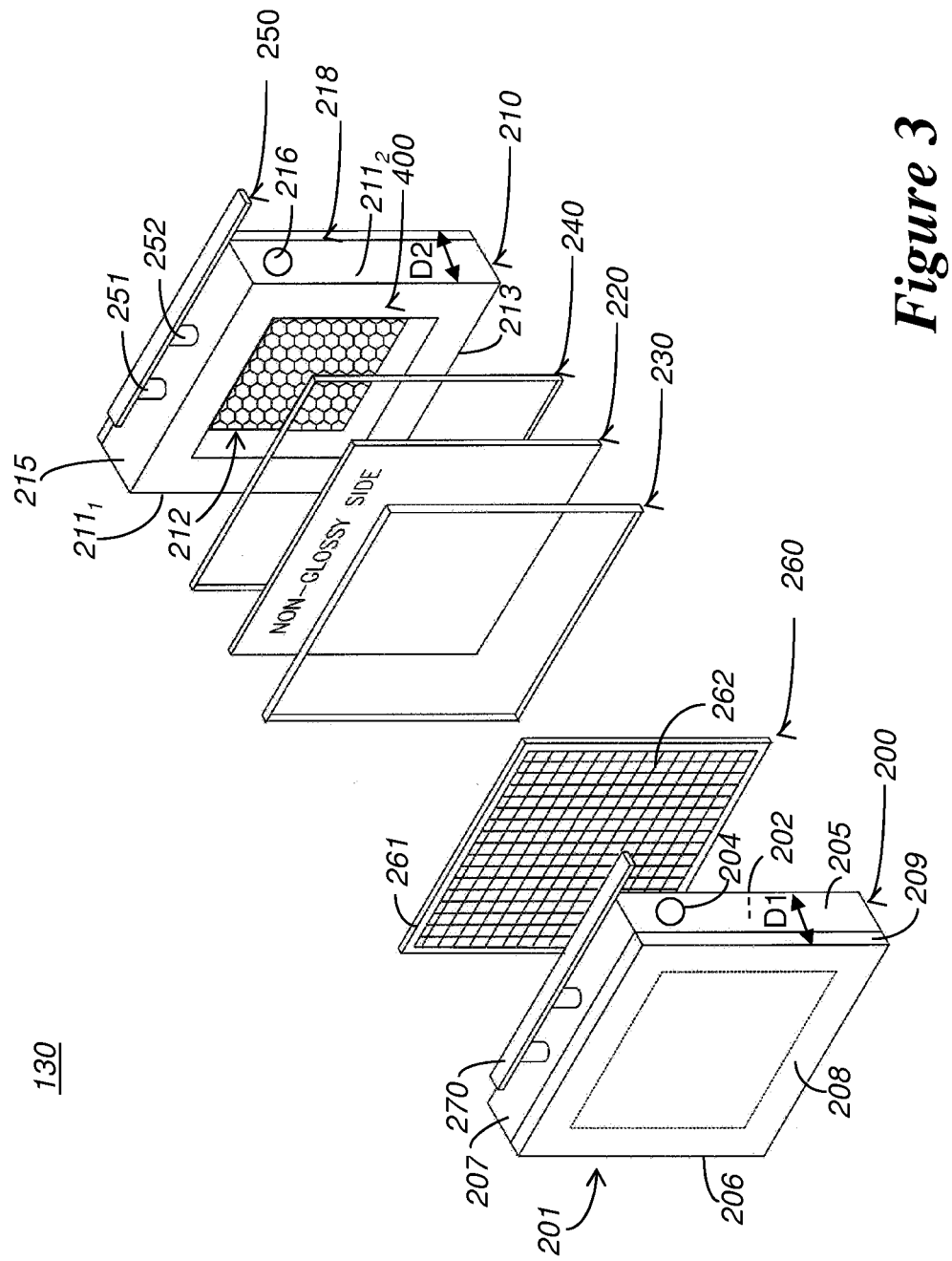
FIG. 3 is a first detailed embodiment of the ME unit of FIG. 2 associated with the EMS subsystem of FIG. 1.

Referring now to FIG. 3, an exemplary embodiment of the reject process unit 130 configured as an ME unit is shown. Being implemented with a "closed frame" design for this embodiment, the ME unit 130 comprises at least one cell formed by a plurality of cell frames 200 and 210, which are separated by a membrane 220 and at least two screen spacers 230 and 240. A first screen spacer 230 is interposed between cell frame 200 and membrane 220 while a second screen spacer 240 is interposed between cell frame 210 and membrane 220.

For this embodiment, each cell frame 200 and 210 is made of a material that mitigates corrosive effects caused by the process and brine solutions as well as harmful effects caused by temperature variations. Examples of the type of material forming the cell frames 200 and 210 include, but are not limited or restricted to PVC, polypropylene and PVDF.

Moreover, each cell frame 200 and 210 is polygon shaped with a thickness (D1, D2) approximately ranging between one-half of an inch (½") to one inch (1"). The thickness of each cell frame 200 or 210 may vary for industrial applications. This thickness may affect the overall system performance as well as provide appropriate mechanical stability.

As further shown in FIG. 3, each cell frame 200 and 210 features a perimeter 201 and 211 and a compartment 202 and 212, respectively. The collective depth of the compartments 202 and 212 is sufficient to house, at a minimum, anode and cathode components, at least one membrane 220 and optional screen spacers 230 and 240.

For this embodiment of the invention, a first cell frame 200 is configured with the anolyte compartment 202 to contain an anode 260 adapted with a positive voltage (referred to as an "anode cell frame"). The anode cell frame 200 comprises an in-flow port 204 positioned along its perimeter 201. For example, an in-flow port 204 may be positioned at a first side edge 205 near a top edge 207 of the anode cell frame 200. This allows fluid (e.g., conductive solution in one embodiment) to flow into the anode cell frame 200. An out-flow port (not shown) is positioned at a second side edge 206 near a bottom edge 208 of the anode cell frame 200. These ports allow fluid (e.g., conductive solution with an elevated level of impurities) to flow into and out of the anode cell frame 200.

For this embodiment of the invention, at least one sidewall 209 of the anode cell frame 200 is either transparent or perhaps translucent. This provides an ability to view internal components and operations within the anode cell frame 200. For instance, where the sidewall 209 is made of a clear PVC material, a person can shine a light into the anode cell frame 200 for inspection purposes during maintenance of the ME unit 130.

As further shown in FIG. 4, a second cell frame 210 is configured with the catholyte compartment 212 to contain a cathode 400 (hereinafter referred to as a "cathode cell frame"). The cathode 400 receives a negative voltage from an external source (e.g., rectifier).

Figure 4:
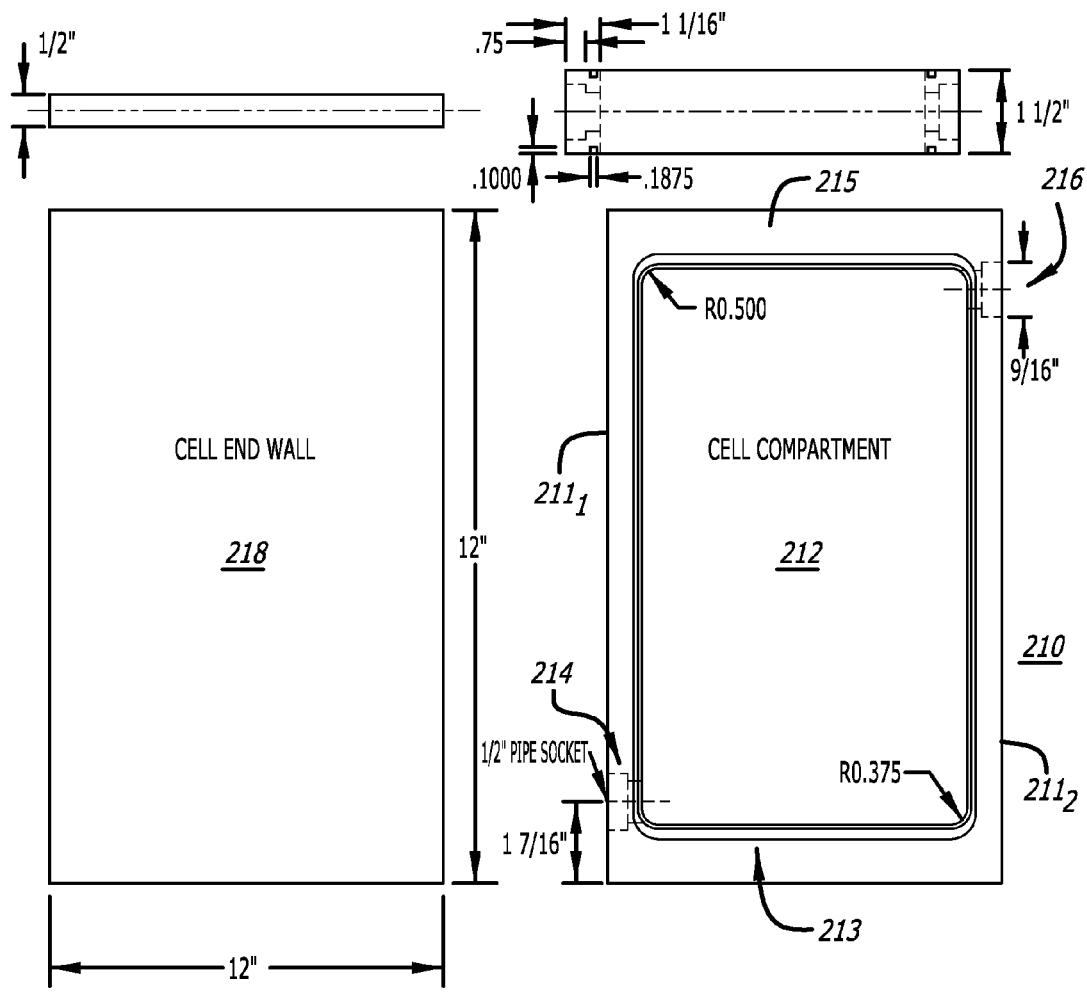
FIG. 4 is an embodiment of a cell frame of FIG. 3.

With respect to cathode cell frame 210, as shown in FIGS. 3 and 4, an in-flow port 214 is positioned along a perimeter (e.g., side edge $211_1$) of the cathode cell frame 210 near a bottom edge 213 of the cell frame 210 as shown in FIG. 4. The in-flow port 214 allows fluid (e.g., contaminated brine solution) to flow into the cathode cell frame 210. An out-flow port 216 is positioned at a side edge $211_2$ near a top edge 215 of the cathode cell frame 210, which allows fluid (e.g., reusable brine solution) to flow out therefrom. The positioning of out-flow port 216 above the in-flow port 214 is designed to substantially mitigate air bubbles.

For this embodiment of the invention, at least one sidewall 218 of cathode cell frame 210 is either transparent or perhaps translucent. This provides an ability to view internal components and operations within the cathode cell frame 210. For instance, where the sidewall 218 is made of a clear PVC material, a person can shine a light into the cathode cell frame 210 for inspection purposes for maintenance of the ME unit 130. For example, one can check whether electrodes of the cell frame 210 are corroded.

It is contemplated that the positioning of in-flow ports and out-flow ports along side edges may alternate between neighboring cell frames. For instance, the cathode cell frame 210 features out-flow port 216 positioned near the top edge 215 of the cathode cell frame 210. For the neighboring anode frame 200, however, the out-flow port (not shown) is positioned near the bottom edge 208 while the in-flow port 204 is positioned near the top edge 207. This provides a cross flow condition for the fluid being processed.

Figure 5:
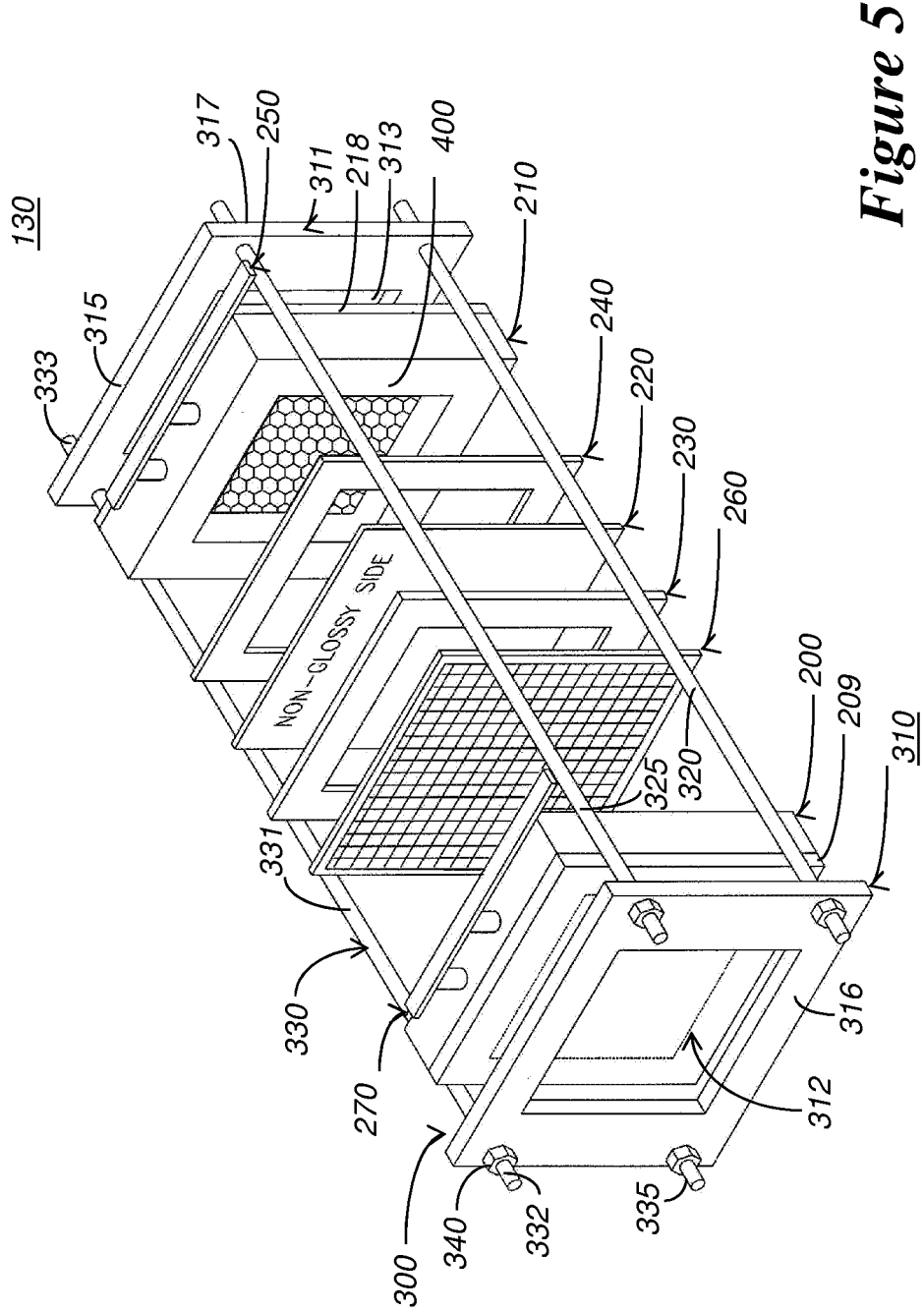
FIG. 5 is a detailed embodiment of the ME unit of FIG. 3 implemented with a clamping unit.

The ME unit 130 may be physically stabilized using two end frames as a clamping unit 300. As shown in FIG. 5, clamping unit 300 comprises two clamping frames 310 and 311, perhaps made of a metal such as stainless steel, placed adjacent to and generally flush against cell frames 200 and 210. In one embodiment, each of the clamping frames 310 and 311 features a center opening 312 and 313, respectively. These openings 312 and 313 are situated over the transparent or translucent sidewalls 209 and 218, respectively.

Each of the clamping frames 310 and 311 also features apertures. Each aperture of the clamping frame 310 is aligned with an aperture of the clamping frame 311. The apertures of the clamping frames 310 and 311 may be predrilled or may be made at the time of assembly.

Fastening rods 320, 325, 330, 335 are inserted through the apertures with fastening components 340 placed at each end or at least one end of the fastening rods 320, 325, 330 and 335. The fastening components 340 may are rotated in a clockwise direction so that clamping frames 310 and 311 are forced closer together and sandwich cell frames 200, 210, spacers 230, 240 and membranes 220 until the ME cell is sealed and stabilized. It is contemplated, however, that the clamping frames 310 and 311 may be forced closer together by hydraulic equipment in lieu of fastening components.

Herein, according to one embodiment of the invention, each rod (e.g., rod 330) comprises a body portion 331, a first end 332 and a second end 333. A first end 332 is sized with a diameter less than the diameter of one of the apertures formed within the clamping frame 310. Inserted through this aperture, the first end 332 of rod 330 may be threaded to receive the fastening component 340. Illustrative examples of a "fastening component" include, but are not limited or restricted to different types of hardware such as a threaded nut, wing nut, lock nut or the like. The fastening component 340 is used to tighten and pull together the clamping frames 310 and 320.

It is contemplated, however, that the fastening component 340 may be a fastener that does not require threaded ends of rods 320, 325, 330 and 335. As a result, a force is applied to a front surfaces 316 and 317 of the clamping frames 310 and 311, where the fastening components 340 are slid on the rods 320, 325, 330 and 335 and secured by soldering, contraction of an opening within the fastening components 340 or the like.

The second end 333 of rod 330 may be sized with a diameter greater than the diameter of its corresponding aperture placed in the second clamping frame 311. Thus, the first end 332 and the body portion 331 of rod 330 is inserted through the aperture until the second end 333 engages with the wall forming the aperture. Alternatively, however, the second end 333 may be sized with a diameter less than the diameter of its corresponding aperture. Hence, another fastening component would be placed thereon.

Figure 6:
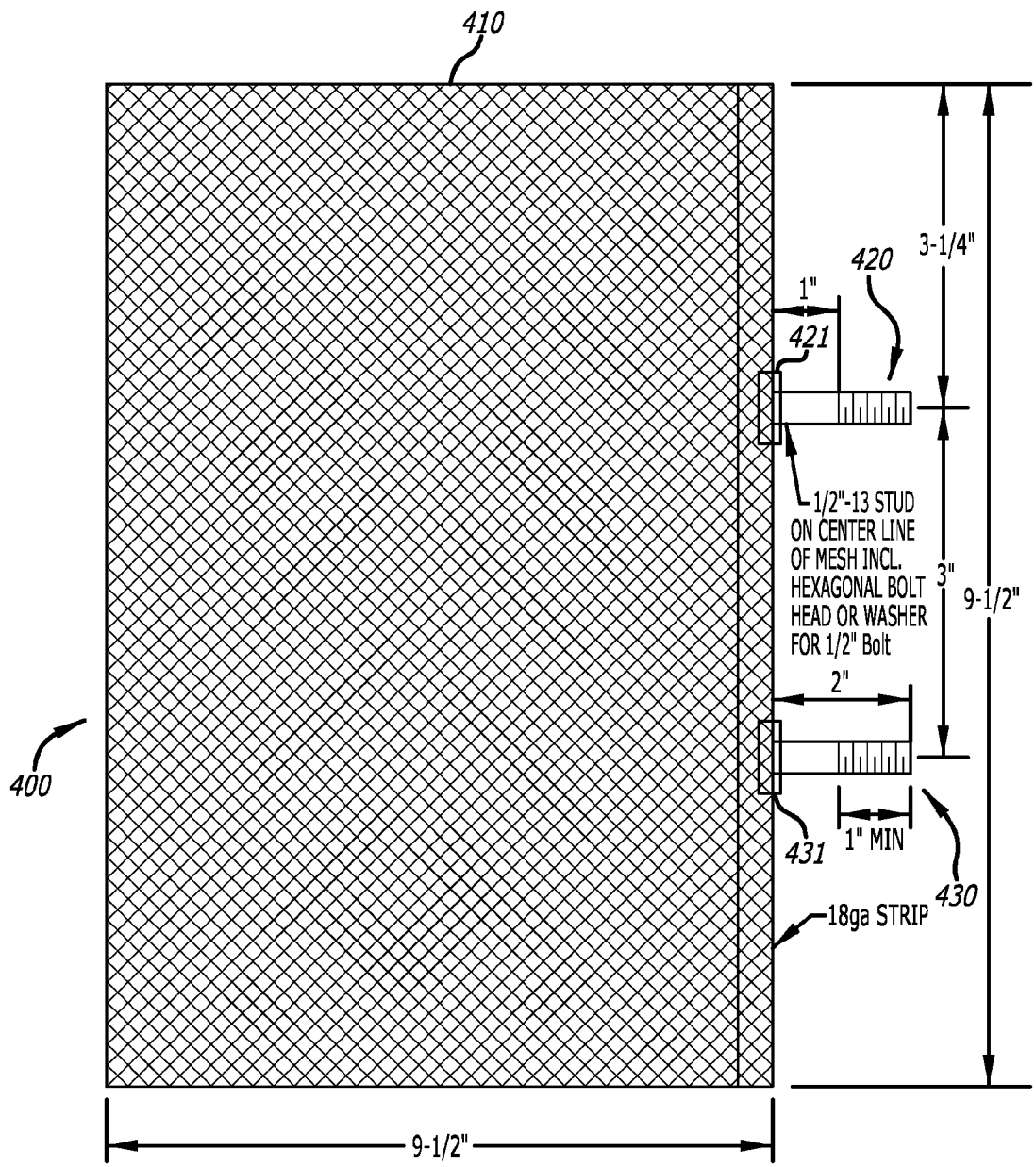
FIG. 6 is an exemplary embodiment of an expanded metal screen cathode of the ME unit of FIG. 3.

Referring now to FIGS. 2 and 6, cathode 400 comprises a material formed as a mesh screen 410. The material is referred to as "expanded metal," such as, for example, platinum, stainless steel or a base material electroplated or cladded with a conductive material (e.g., platinum plated titanium, iridium plated titanium, iridium oxide coated titanium, etc.). Of course, the cathode 400 may be deployed in a variety of embodiments besides as an expanded metal screen cathode, such as a filling (e.g., negatively charged metal or carbon beads) for example.

Herein, for this embodiment, cathode 400 comprises a plurality of electrical connectors (electrodes) 420 and 430, a portion 421, 431 of which are made of expanded metal. These electrodes 420 and 430 protrude from the mesh screen 410 for coupling with a bus bar 250 on a top edge 215 of the cell frame 210 as shown in FIG. 3. The bus bar 250 includes connectors 251 and 252 sized to receive connectors 420 and 430 for attachment thereto.

For this embodiment of the invention, as shown in FIG. 3, anode cell frame 200 comprises the anode 260, which is configured as a self-supporting screen and placed between screen spacer 230 and housed within the anolyte compartment 202 of anode cell frame 200. The screen is self-supporting by the inclusion of a frame 261 bordering a perimeter of screening material 262. A bus bar 270 is attached to the anode 260 via connectors as used for attachment of the cathode 400. However, in this embodiment, the connectors may need to be of greater length than connectors 420 and 430 of FIG. 6.

Referring still to FIG. 3, the cell frames 200 and 210 of the ME unit 130 are completely closed, but may be coupled to an external tank with ventilation. This coupling allows off-gassing when the electrodes are energized and electrochemical reactions occur in the inside of the cell frames 200 and 210 at the electrodes.

Each spacer 230 and 240 includes a gasket structure, a one-piece structure according to one embodiment, and is made from a material that provides good mechanical and stability properties at the interface between the gasket and a cell frame. The spacers 230 and 240 provide a pressurized seal between the cell frames 200 and 210 and the membrane 220.

Figure 7:
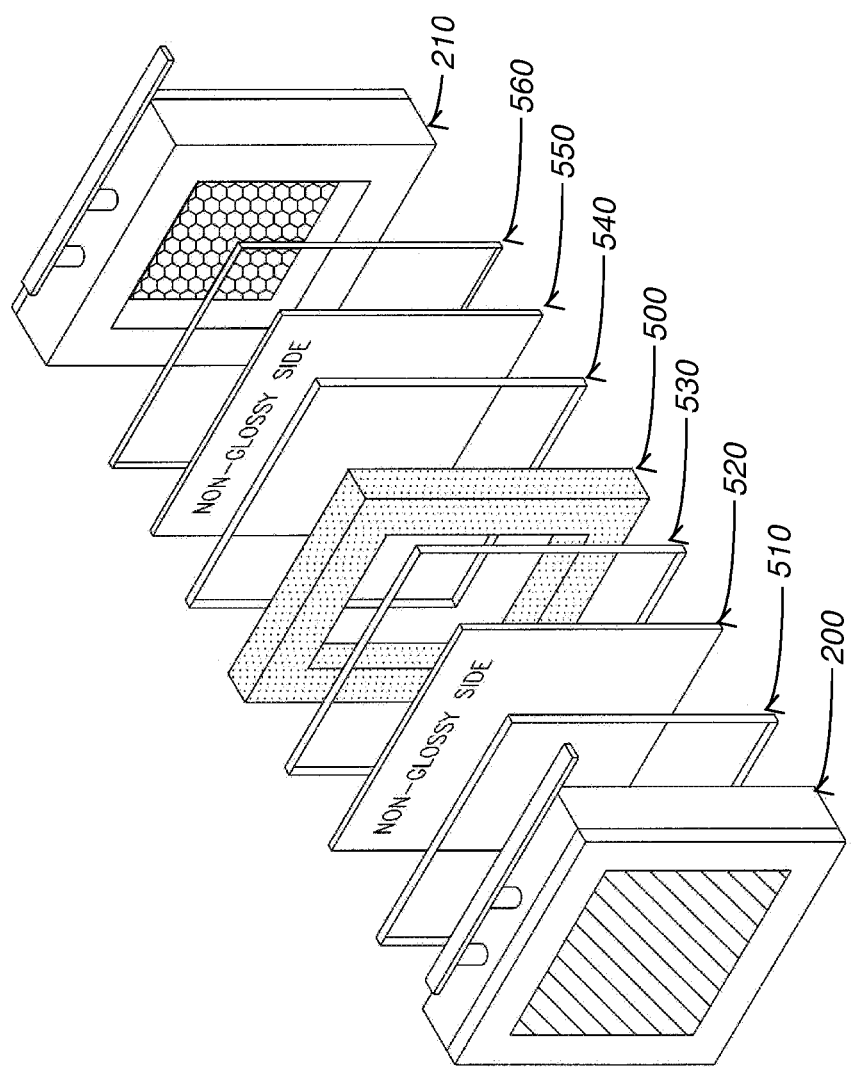
FIG. 7 is a second detailed embodiment of the ME unit of FIG. 2.

In another embodiment, as shown in FIG. 7, a second exemplary embodiment of the ME unit 130 is shown. The ME unit 130 comprises the anode cell frame 200 and the cathode cell frame 210 separated by a third non-conductive frame (referred to as "PVC frame") 500. The anode cell frame 200 neighbors a first screen spacer 510. A first membrane 520 is interposed between the first screen spacer 510 and a second screen spacer 530, which neighbors PVC frame 500. PVC frame 500 is similar in construction to cell frames 200 and 210 but does not include electrodes. This multiple membrane configuration with additional components (e.g., spacer 540, second membrane, spacer 560) may be repeated to support an additional membrane between PVC frame 500 and cathode cell frame 210. It is noted that these additional components may be repeated for additional cell frames or cells.

Figure 8:
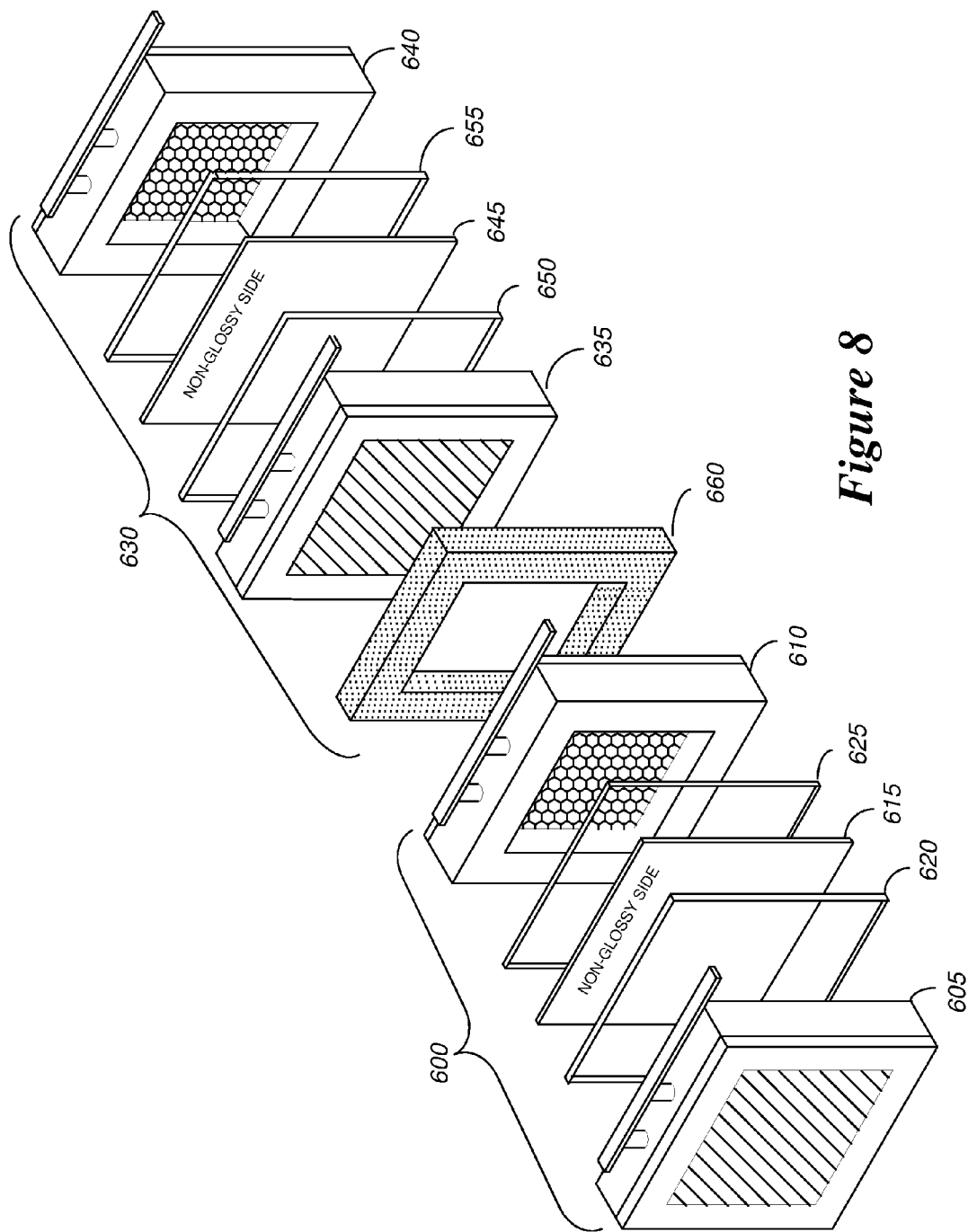
FIG. 8 is a third detailed embodiment of the ME unit having multiple cells.

For instance, as shown in FIG. 8, it is contemplated that multiple cells may be interconnected through PVC frames. As an illustration, a first cell 600 comprises an anode cell frame 605, a cathode cell frame 610, and a first membrane 615. Spacers 620 and/or 625 may be optionally provided between the first membrane 615 and the respective cell frames 605 and 610. A second cell 630 comprises an anode cell frame 635, a cathode cell frame 640, a second membrane 645 and optional spacers 650 and/or 655. A PVC frame 660 is interposed between the cells 600 and 630 so that fluid may be exchanged between the cell frames and the cells themselves in a cross flow orientation as described in FIG. 3.

When an ED unit is utilized such as in desalination as described below, it has a similar construction to an ME unit as shown in FIGS. 5 and 6. The ED unit would feature multiple cell frames alternating between anode and cathode cell frames with an inert frame placed between each anode and cathode cell frame pair. The ED unit would further feature clamping frames at each end of the ED unit and secured together through hydraulics for example.

IV. Brine recovery/Removal of Monovalent Ion

Figure 9:
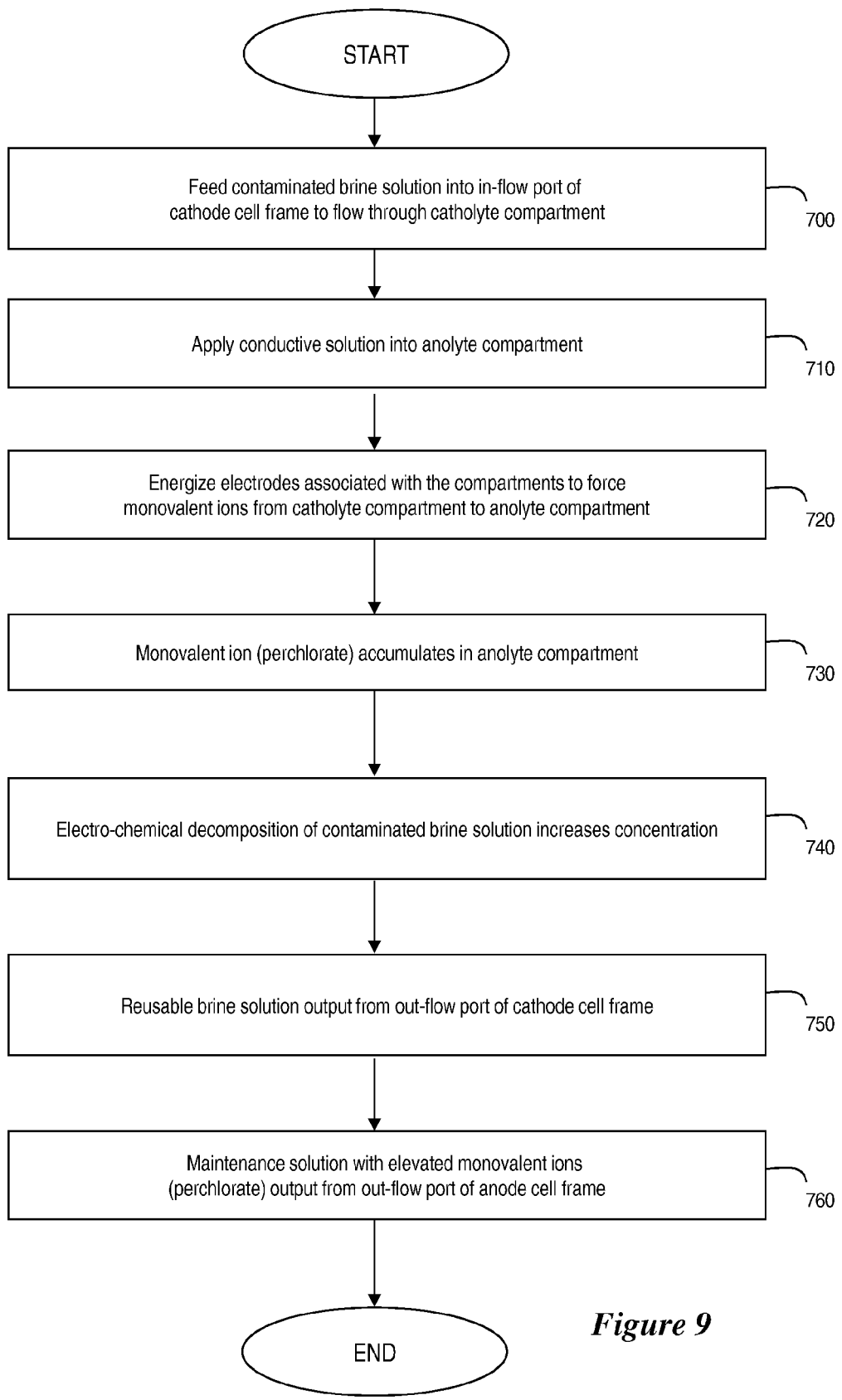
FIG. 9 is an exemplary embodiment of a flowchart of the operations of an EMS subsystem to recover the brine solution and remove an impurity such as perchlorate.

Referring now to FIG. 9, an exemplary embodiment of a flowchart of the operations of an EMS subsystem to recover the brine solution and remove an impurity, such as a monovalent anion (perchlorate) for example, from the ME unit 130 is shown. A brine solution, being a high volume in order of magnitude of a thousand gallons or more, is feed into an in-flow port of a cathode cell frame in order to flow through the catholyte compartment of the ME unit (block 700). A conductive maintenance solution, having a volume substantially less in magnitude than the brine solution, is applied to the anolyte compartment of the ME unit via an in-flow port of an anode cell frame (block 710).

Generally concurrent to the supply of the brine and maintenance solutions, the electrodes associated with these compartments are energized to generate a current that forces monovalent anions to migrate from the catholyte compartment through the membrane to the anolyte compartment (block 720). Since perchlorate is a monovalent ion, depending on the adjusted current density in the EMS subsystem, it migrates into the anolyte compartment of the EMS subsystem.

Due to this migration, the perchlorate accumulates in the anolyte compartment of the ME unit (block 730). This migration causes a significant reduction in the perchlorate concentration in the contaminated brine solution. Moreover, an electro-chemical decomposition (off-gassing) of water during processing of the contaminated brine solution causes an increased concentration of the reusable brine solution (block 740).

Hence, as shown in block 750, the reusable brine solution, substantially free of the perchlorate, is output from an out-flow port of the cathode cell frame and can be used for further regeneration of the ion exchange resins (block 750). This avoids unnecessary disposal of the brine solution. The maintenance solution with an elevated level of perchlorate is output from an out-flow port of the anode cell frame for waste treatment or storage (block 760).

It is contemplated that another monovalent anion, such as nitrate, may be treated in a manner similar to perchlorate. This will be facilitated when nitrate is removed from an ion exchange resin bed with a brine solution.

If nitrate is contaminant of an aqueous solution (surface water, groundwater, potable water, etc.), an alternative treatment process can be applied. Such treatment would be conducted within an ED unit, not an ME unit. For this embodiment of the invention, the process solution (e.g., surface, potable or ground water) is feed into an in-flow port of a cathode cell frame in order to flow through the catholyte compartment of the ED unit. The maintenance solution is feed into the anolyte compartment. Once the electrodes associated with these compartments are energized, the nitrate migrates into the anolyte compartment and outputs the same as reject.

V. Brine recovery/removal of Heavy Metal

Figure 10:
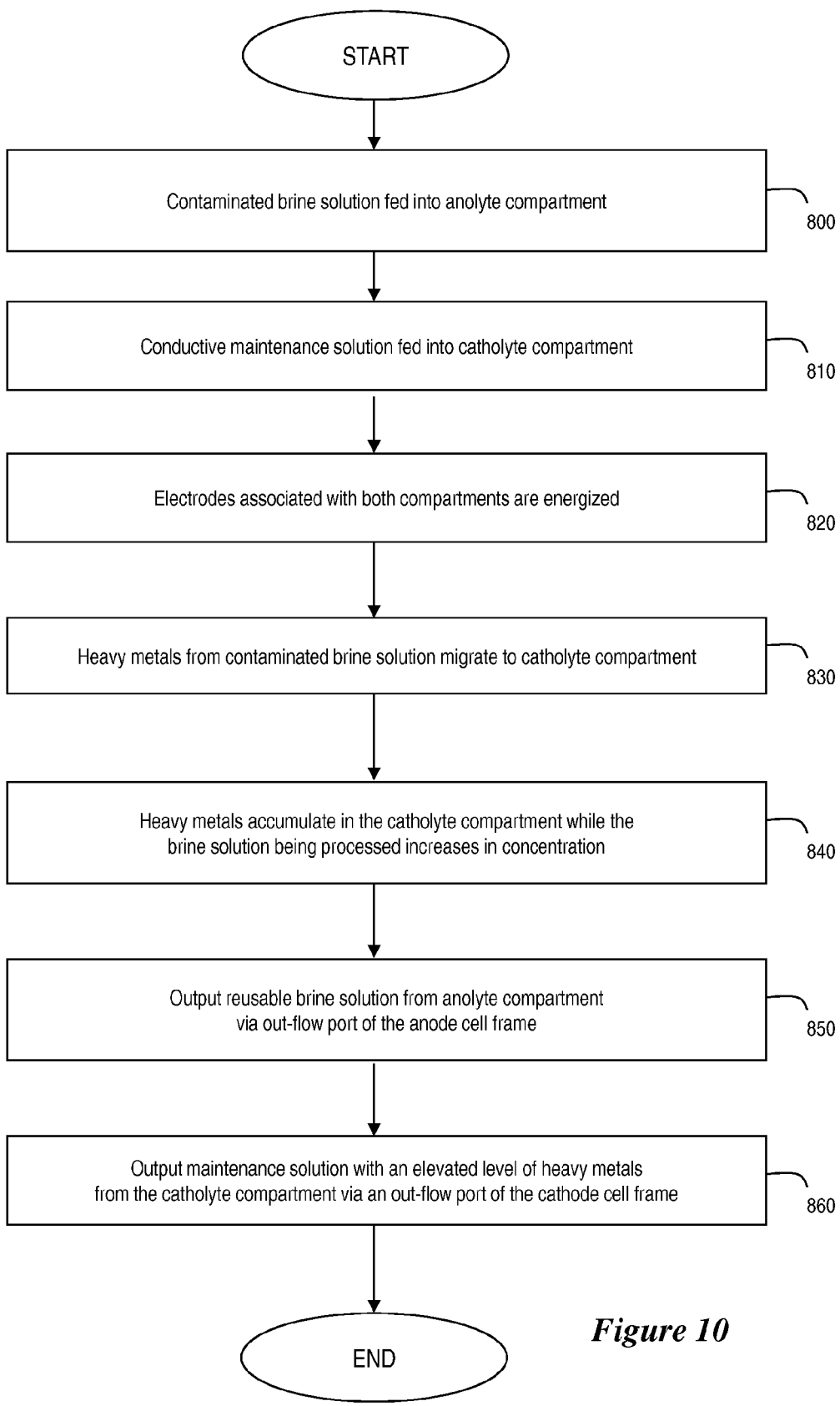
FIG. 10 is an exemplary embodiment of a flowchart of the operations of the EMS subsystem to recover the brine solution and remove an impurity, such as heavy metals for example.

Referring now to FIG. 10, an exemplary embodiment of a flowchart of the operations of the EMS subsystem 100 to recover the brine solution and remove an impurity, such as heavy metals for example, from the ME unit 130 is shown. The operations are substantially equivalent to the operations for removing perchlorate as described in FIG. 9; however, the contaminated brine solution is fed into the in-flow port of the anode cell frame while a negatively conductive maintenance solution is fed into the in-flow port of the cathode cell frame (blocks 800 and 810).

Generally concurrent to the supply of the brine and conductive maintenance solutions, the electrodes associated with these compartments are energized (block 820). The amount of current is adjusted so that the current density forces any of the heavy metals to migrate from the anolyte compartment through the membrane to the catholyte compartment (block 830). As a result, the heavy metals accumulate in the catholyte compartment of the ME unit (block 840), while off-gassing of the water forming a portion of the contaminated brine solution causes an increased concentration of the reusable brine solution (block 850).

Hence, the reusable brine solution, substantially free of heavy metals, is output from an out-flow port of the anode cell frame (block 860). The maintenance solution with an elevated level of heavy metals is output from an out-flow port of the cathode cell frame for waste treatment or storage (block 860).

VI. Brine Recovery/Removal of Hardness

Figure 11:
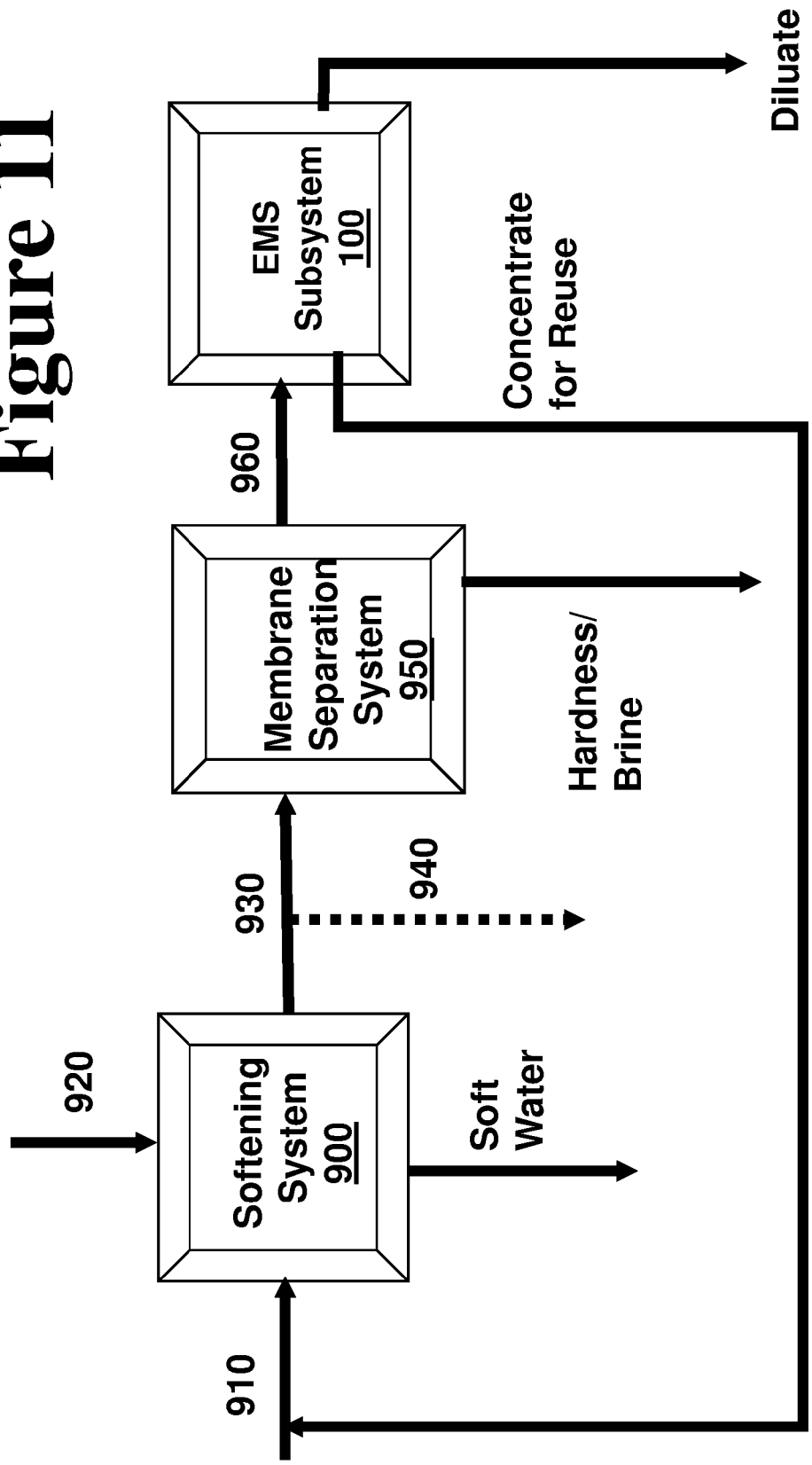
FIG. 11 is an exemplary embodiment of an EMS subsystem for reducing hardness in drinking water and recycling the brine solution for reuse.

Referring now to FIG. 11, an exemplary embodiment of an EMS subsystem for reducing hardness in drinking water and recycling the brine solution for reuse is shown. Hardness in drinking water is removed by an ion exchange softening system 900. Typically, these ion exchange resin beds are regenerated with a combination of brine solution 910 and surface water 920 that removes the hardness (e.g., calcium, magnesium, barium, strontium, iron and manganese) from the ion exchange resin beds. Previously, the contaminated brine solution 930 now containing the hardness was discharged into a wastewater treatment plant or into percolation ponds, if available, as illustrated by dashed arrow 940.

According to one embodiment of the invention, the ion exchange softening system 900 is in fluid communications with a membrane separation system 950, such as a nano-filter for example, to remove hardness from the contaminated brine solution 930 that has been further diluted by the softening system 900. The EMS subsystem 100 receives a filtered brine solution 960, which has been diluted so as to have a lower concentration than the brine solution 910. The EMS subsystem 100 operates by increasing the concentration of the brine solution for reuse.

Figure 12:
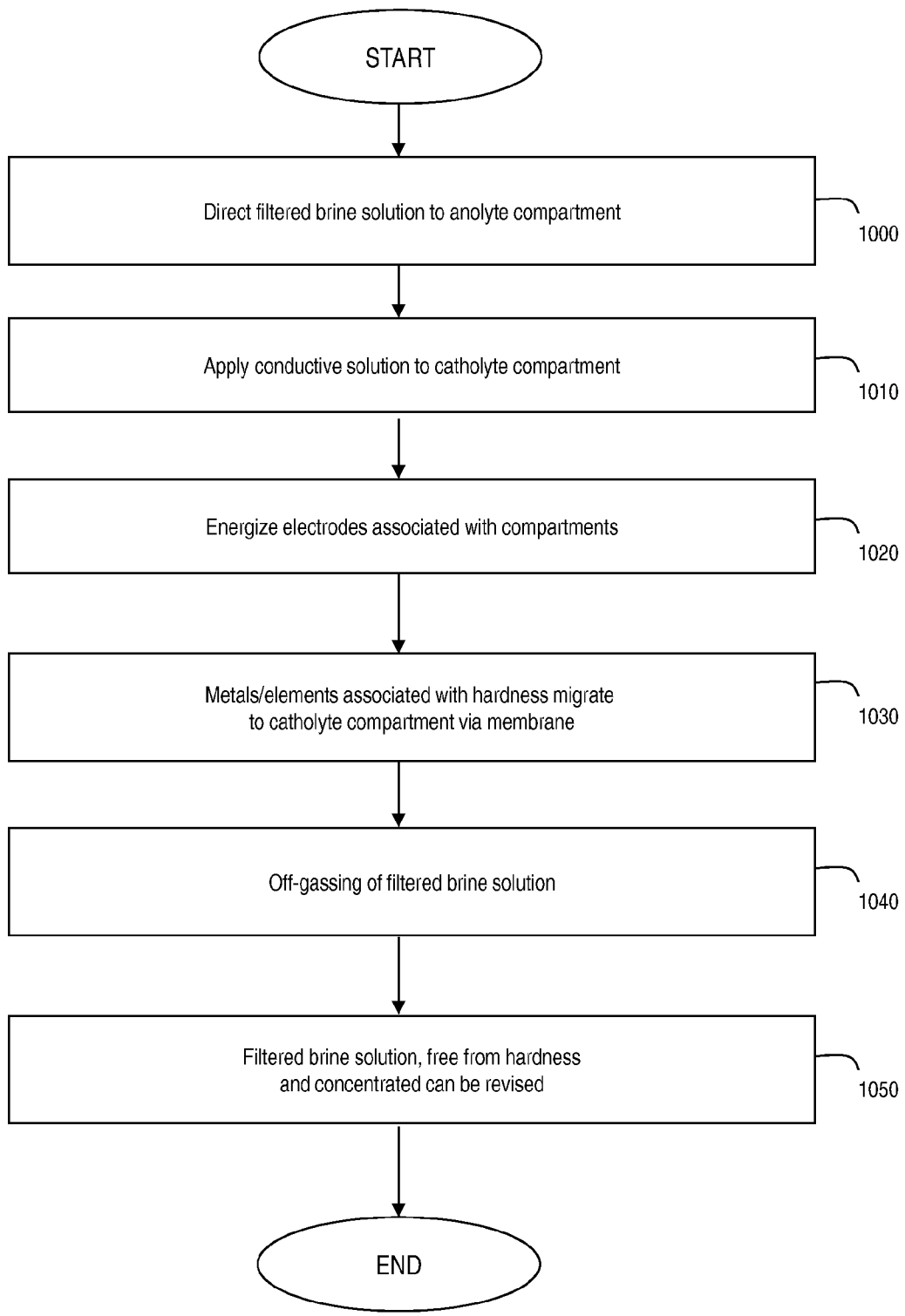
FIG. 12 is an exemplary embodiment of a flowchart of the operations of the EMS subsystem to increase the concentration of the decontaminated brine solution for reuse.

Referring now to FIG. 12, an exemplary embodiment of a flowchart of the operations of the EMS subsystem 100 to increase the concentration of the decontaminated brine solution for reuse is shown. After treatment by the nano-filter to remove hardness, the filtered brine solution is directed to flow into an anolyte compartment of a first cell frame of the ME unit via an in-flow port (block 1000). A negatively conductive solution having a volume substantially less than the volume of the filtered brine solution, perhaps less than ten times that of the filtered brine solution, is applied to a catholyte compartment of a second cell frame of the ME unit via an in-flow port (block 1010). Generally concurrent to the supply of solutions, the electrodes associated with these compartments are energized to generate a current that forces the metals associated with hardness to migrate from the anolyte compartment through the membrane to the catholyte compartment (blocks 1020 and 1030).

Due to this migration and electro-chemical decomposition (off-gassing) of water forming the filtered brine solution, an increased concentration of the brine solution is produced (block 1040). Hence, the filtered brine solution, substantially free of the hardness, can be reused for further regeneration of the ion exchange resin beds without disposal or further treatment (block 1050).

VII. Brine Recovery/Water Desalination

Figure 13:
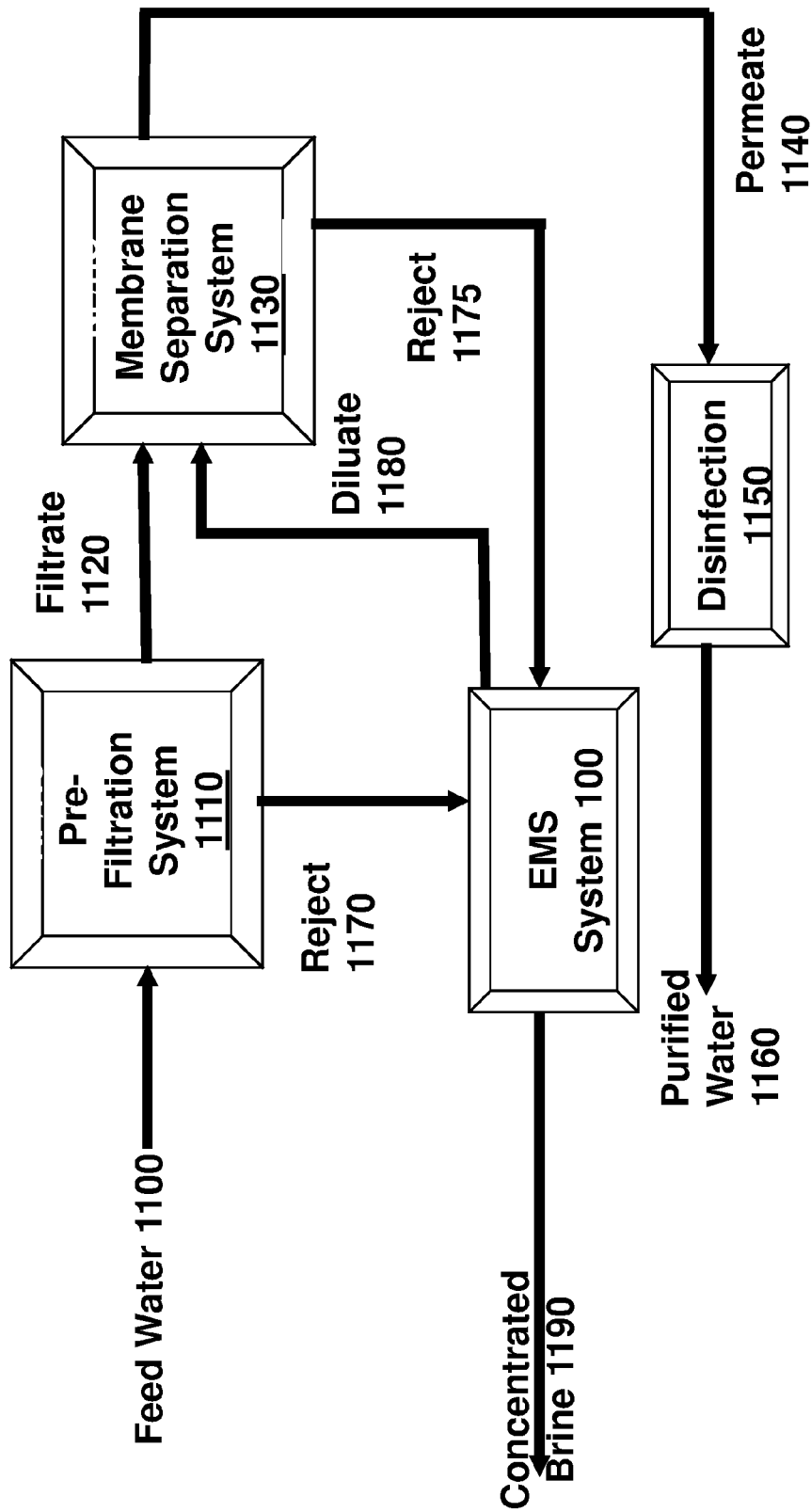
FIG. 13 is an exemplary embodiment of EMS subsystem for water desalination and recycling of the brine solution for reuse.

Referring to FIG. 13, an exemplary embodiment of EMS subsystem for water desalination and recycling of the brine solution for reuse is shown. Herein, feed water 1100 with low overall quality (e.g., ground water, potable water, etc.) is supplied to one or more pre-filtration systems (e.g., micro-filter, ultra-filter, etc.) 1110. According to this embodiment of the invention, the pre-filtration system 1110 is designed to remove suspended solids and other organic material from the feed water 1100. The filtrate 1120, namely the filtered feed water, is supplied to a membrane separation system 1130 (e.g., nano-filter, Reverse Osmosis, etc.) in order to remove one or more selected impurities (e.g., total dissolved solids). The membrane separation system 1130 produces a permeate 1140, which undergoes disinfection 1150 (e.g., ultraviolet light radiation, chlorination, etc.). This results in purified water 1160.

During these operation, a first reject solution 1170 and a second reject solution 1175 are provided to the EMS subsystem 100 from systems 1110 and 1130, respectively. The EMS subsystem 100 removes the impurities associated with the reject solutions 1170 and 1175 and provides a diluate 1180 (e.g., a solution generally equivalent in composition to the filtrate 1120) to the membrane separation system 1130 for further processing. Additionally, the EMS subsystem 100 provides a filtered, concentrated reject solution 1190 for disposal or recycling.

VIII. Brine Recovery/Removal of Bivalent Ion (Arsenic)

Figure 14:
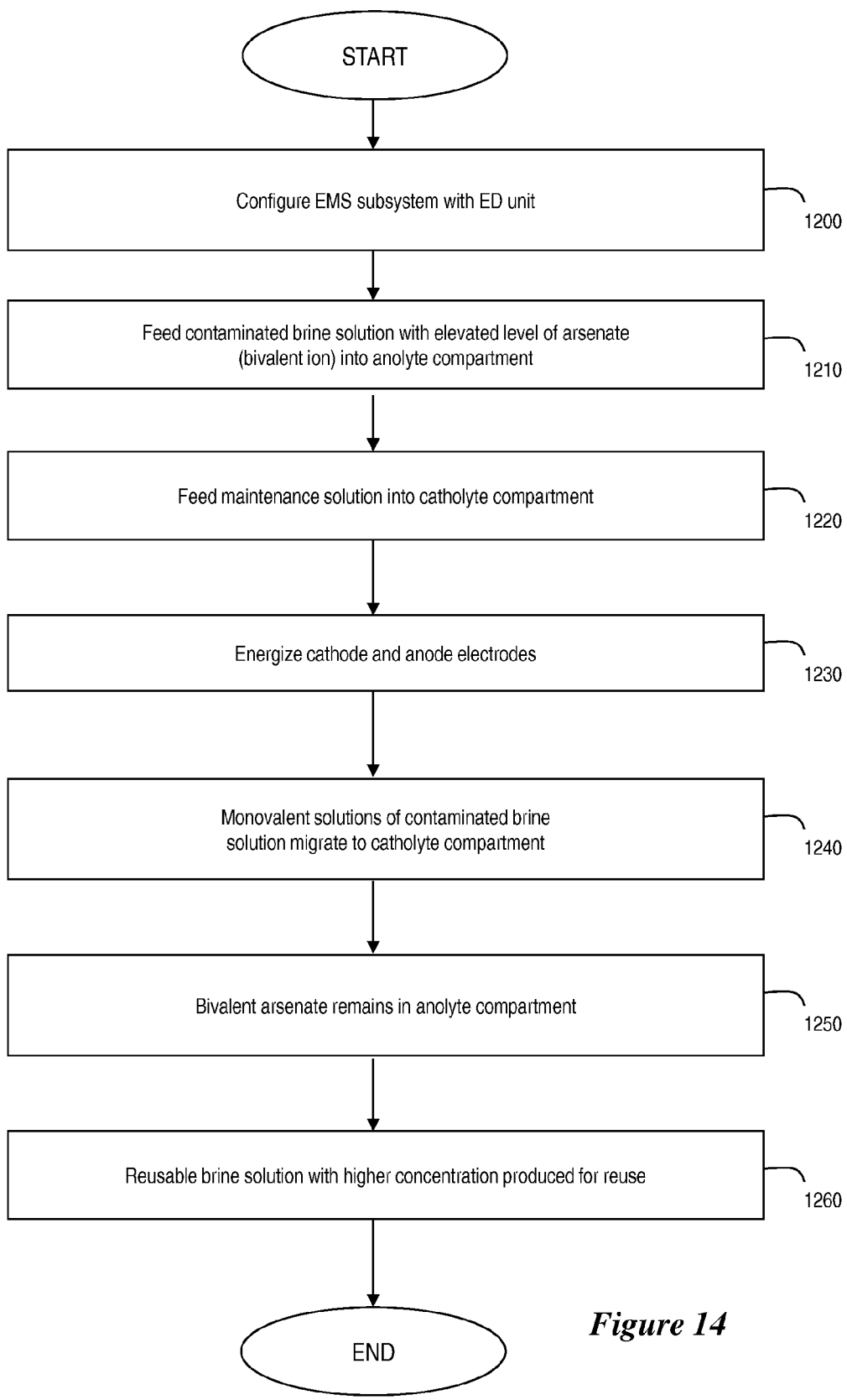
FIG. 14 is an exemplary embodiment of a flowchart of the operations of the EMS subsystem to recover the brine solution and remove an impurity, such as a bivalent anion (arsenic) for example.

Referring now to FIG. 14, an exemplary embodiment of a flowchart of the operations of the EMS subsystem 100 to recover the brine solution and remove an impurity, such as a bivalent anion (arsenic) for example, is shown. The brine solution is based on a monovalent aqueous salt solution, so that arsenate can be separated from the brine solution using selective membranes.

More specifically, the EMS subsystem 100 is configured with an ED unit (block 1200). A contaminated brine solution with an elevated level of arsenate is feed into an anolyte compartment of the anode cell frame via an in-flow port of an anode cell frame (block 1210). A negatively conductive maintenance solution, having a volume substantially less in magnitude than the contaminated brine solution, is applied to an catholyte compartment of the ME unit via an in-flow port of an cathode cell frame (block 1220).

Generally concurrent to the supply of the contaminated brine and maintenance solutions, the electrodes associated with these compartments are energized to generate a current that forces monovalent salt ions of the brine solution to accumulate within the catholyte compartment through membrane migration (blocks 1230 and 1240). Since arsenate is a bivalent ion, it will remain in the anolyte compartment and be output with the maintenance solution for waste treatment and/or disposal (block 1250). This filters the contaminated brine solution, and in combination with out-gassing, produces a filtered, concentrated brine solution for regeneration of ion exchange resin beds (block 1260).

While the invention has been described in terms of several embodiments, the invention should not be limited to only those embodiments described, but can be practiced with modification and alteration within the spirit and scope of the appended claims. The description is thus to be regarded as illustrative instead of limiting.

What is claimed is:

1. A system comprising:
   an impurity separation subsystem to: (1) receive (i) a feed solution including a selected impurity, and (ii) a brine solution, (2) remove a selected impurity from the feed solution to produce an output solution that is free from the selected impurity, (3) transfer the removed selected impurity to the brine solution to produce a reject solution, and (4) output (i) the reject solution being the brine solution including the removed selected impurity and (ii) the output solution being the feed solution having the selected impurity removed therefrom, wherein the selected impurity includes perchlorate; and
   an electrolytic membrane separation (EMS) subsystem in fluid communications with the impurity separation subsystem, the EMS subsystem comprises (a) first cell frame that comprises an anolyte compartment to house an anode, the anolyte compartment comprises a first in-flow port and a first out-flow port, (b) a second cell frame having a catholyte compartment to house a cathode, the catholyte compartment comprises a second in-flow port and a second out-flow port, and (c) a membrane positioned between the anolyte compartment and the catholyte compartment,
   wherein the EMS subsystem to (1) receive the reject solution from the impurity separation subsystem that is supplied to the catholyte compartment of the EMS subsystem through the second in-flow port and an electrically conductive solution that is supplied to the anolyte compartment of the EMS subsystem through the first in-flow port, (2) remove the selected impurity from the reject solution to produce a reusable brine solution or a diluate, and (3) transfer the selected impurity to the conductive solution to produce a waste solution that is the conductive solution including the selected impurity.

2. The system of claim 1, wherein the EMS subsystem further outputs the reusable brine or the diluate for re-use, and the waste solution for further treatment and waste handling.

3. The system of claim 2, wherein the impurity separation system is an ion exchange unit that comprises an ion exchange resin that removes the selected impurity from the feed solution.

4. The system of claim 3, wherein the brine solution of the reject solution is used to regenerate the ion exchange resin.

5. The system of claim 2, wherein the reject solution produced by the impurity separation subsystem includes a diluted brine regenerate solution that achieves an increased concentration through off-gasing.

6. The system of claim 1, wherein the EMS subsystem further outputs the diluate to a flow including the output solution.

7. The system of claim 1, wherein the reject solution includes a brine solution used to regenerate an ion exchange resin.

8. The system of claim 7, wherein the EMS subsystem produces the reusable brine solution for output from the second out-flow port and outputs the waste solution via the first out-flow port as waste.

9. The system of claim 1 further comprising:
   a pre-filtration system in fluid communications with the impurity separation system where the feed solution is a filtrate being a filtered feed solution.

10. The system of claim 1, wherein the impurity separation subsystem and the EMS subsystem are separate systems physically separated from each other.

11. The system of claim 10, wherein the reusable brine solution is provided to the impurity separation subsystem as the brine solution.

12. The system of claim 1, wherein the selected impurity further includes nitrate.

13. The system of claim 1, wherein the selected impurity further includes arsenic.

* * * * *